(12) United States Patent
Hosoi et al.

(10) Patent No.: US 10,010,480 B2
(45) Date of Patent: Jul. 3, 2018

(54) ABSORBING LAYER FOR BLISTER PACKAGE, LAMINATE COMPRISING SAME, AND BLISTER PACKAGE USING SAID LAMINATE

(71) Applicant: Kyodo Printing Co., Ltd., Tokyo (JP)

(72) Inventors: Masayuki Hosoi, Tokyo (JP); Kazumi Arai, Tokyo (JP); Midori Kato, Tokyo (JP); Makoto Kato, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 0 days.

(21) Appl. No.: 15/319,557

(22) PCT Filed: Jun. 18, 2015

(86) PCT No.: PCT/JP2015/067660
§ 371 (c)(1),
(2) Date: Dec. 16, 2016

(87) PCT Pub. No.: WO2015/194646
PCT Pub. Date: Dec. 23, 2015

(65) Prior Publication Data
US 2017/0319433 A1     Nov. 9, 2017

(30) Foreign Application Priority Data
Jun. 18, 2014 (JP) ................. 2014-125032

(51) Int. Cl.
| | |
|---|---|
| *A61J 1/03* | (2006.01) |
| *B65D 81/26* | (2006.01) |
| *B32B 27/32* | (2006.01) |
| *B32B 15/20* | (2006.01) |
| *B32B 15/085* | (2006.01) |
| *B32B 27/08* | (2006.01) |

(52) U.S. Cl.
CPC .............. *A61J 1/035* (2013.01); *B32B 15/085* (2013.01); *B32B 15/20* (2013.01); *B32B 27/08* (2013.01);
(Continued)

(58) Field of Classification Search
CPC ........ A61J 1/035; B65D 81/26; B32B 27/327; B32B 15/20; B32B 15/085; B32B 27/08; B32B 2307/538
See application file for complete search history.

(56) References Cited

U.S. PATENT DOCUMENTS

| | | |
|---|---|---|
| 6,006,913 A | 12/1999 | Ludemann et al. |
| 2013/0168270 A1 | 7/2013 | Koizumi et al. |
| 2015/0291337 A1 | 10/2015 | Koizumi et al. |

FOREIGN PATENT DOCUMENTS

| | | |
|---|---|---|
| JP | 2003-266618 A | 9/2003 |
| JP | 2007 016059 A | 1/2007 |

(Continued)

OTHER PUBLICATIONS

International Search Report dated Sep. 1, 2015 issued in corresponding PCT/JP2015/067660, 1 page.
(Continued)

*Primary Examiner* — Michael C Miggins
(74) *Attorney, Agent, or Firm* — Millen White Zelano and Branigan, PC

(57) ABSTRACT

The purpose of the present invention is to provide an absorbent layer for blister packs, which imparts sufficient formability and is free from forming failure even if a pocket part is formed to a certain depth. An absorbent layer for blister packs, which sequentially comprises, in the following order, an outer skin layer, an intermediate layer containing an inorganic absorbent and a binder resin, and an inner skin layer containing 5-80% by mass of a metallocene polypropylene and 95-20% by mass of a non-metallocene polypropylene.

13 Claims, 1 Drawing Sheet

(52) U.S. Cl.
CPC ............ *B32B 27/327* (2013.01); *B65D 81/26* (2013.01); *B32B 2307/538* (2013.01)

(56) References Cited

FOREIGN PATENT DOCUMENTS

| | | | |
|---|---|---|---|
| JP | 2010-168052 | A | 8/2010 |
| JP | 2010 228309 | A | 10/2010 |
| JP | 2013 199283 | A | 10/2013 |
| WO | 2006/115264 | A1 | 11/2006 |
| WO | 2013/140821 | A1 | 9/2013 |
| WO | 2012/029323 | A1 | 10/2013 |

OTHER PUBLICATIONS

English translation Abstract of JP2010-168052A published Aug. 5, 2010 (1 page).
English translation Abstract of JP2003-266618A published Sep. 24, 2003 (1 page).
European Search Report/Supplementary European Search Report dated Nov. 14, 2017 issued in corresponding Application No. Ep 15 80 9086.
English Abstract and Machine Translation of JP 2013 199283 dated Oct. 3, 2013.
English Abstract and Machine Translation of JP 2007 016059 dated Jan. 25, 2007.
English Abstract and Machine Translation of JP 2010 228309 dated Oct. 14, 2010.
English Abstract and Machine Translation of Publication No. JP 2006-334819—Date of Publication Dec. 14, 2006—Corresponding to WO 2012029323 (A1)—Oct. 28, 2013.
English Abstract and Machine Translation of Publication No. JP 2006-327690—Date of Publication Dec. 7, 2006—corresponding to WO 2006115264 (A1)—Nov. 2, 2006.
Bibliographic Data—English Abstract of WO 2013140821—Date of Publication Sep. 26, 2013.

ABSORBING LAYER FOR BLISTER PACKAGE, LAMINATE COMPRISING SAME, AND BLISTER PACKAGE USING SAID LAMINATE

TECHNICAL FIELD

The present invention relates to an absorbing layer for a blister package, a laminate comprising said absorbing layer, and a blister package that uses said laminate. More particularly, the present invention relates to an absorbing layer for a blister package that is free of the occurrence of molding defects even if a pocket is formed at a certain depth in order to package a large pharmaceutical preparation, a laminate comprising said absorbing layer, and a blister package that uses said laminate.

BACKGROUND ART

Although powdered pharmaceutical preparations are enclosed in thin-walled paper pouches or pouches made of plastic film, preparations such as tablets or capsules are enclosed in blister packages referred to as press-though packages (PTP). The preparation can be removed by breaking a sheet-like cover by pressing on the preparation enclosed in the blister package with a finger.

Pharmaceutical preparations are subject to deterioration of the pharmacologically active ingredient following absorption of moisture. Consequently, a desiccant such as silica gel has conventionally been enclosed within the outer pouch that encloses the blister package. However, the work of placing a desiccant in the outer pouch is labor-intensive, and there is also the risk of the desiccant being accidentally swallowed or consumed. In addition, there was also the problem of a low level of humidity being unable to be maintained within the blister package after opening the outer pouch, thereby resulting in progression of deterioration of the pharmaceutical preparation. Moreover, since certain preparations are susceptible to oxidative degradation or emit a peculiar odor, there is also the need to be able to absorb oxygen and odors present within the blister package.

In contrast, Patent Document 1 discloses a technology whereby long-term stability of a pharmaceutical preparation is improved by forming an absorbing layer having an absorbent within a blister package. In this technology, a dome-shaped pocket is first formed in a laminate consisting of a barrier layer in the form of a substrate and an absorbing layer. A pharmaceutical preparation in the form of a tablet is then placed in the pocket and sealed therein by a cover. According to this technology, the maintaining of a dry state, prevention of oxidation and efficient removal of odors are thought to be possible even if a desiccant and the like is not included in the outer pouch.

In addition, since some pharmaceutical preparations are susceptible to ultraviolet light, if a transparent packaging container is used, there is the risk of degradation of the pharmacologically active ingredient. In contrast, Patent Document 2, for example, discloses a so-called aluminum blister package that employs a technology whereby an aluminum layer is also formed in the laminate for a blister package on the top side instead of only in a cover on the back side of the blister package. According to this technology, since an aluminum layer is provided in the blister package, although it is no longer possible to visualize the pharmaceutical contained therein, ultraviolet light can be blocked and barrier properties can be further enhanced.

In an aspect that simply combines the aforementioned two technologies, problems such as rupturing of the roof of the dome or the formation of cracks in the skirt or shoulder of the dome occur when a dome-shaped pocket is formed in a laminate for a blister package. In order to overcome these problems, Patent Document 2 inserts a reinforcing layer using a specific polymer between the aluminum layer and the absorbing layer. In this aspect, although moldability is improved considerably, depending on the type of molding machine or molding depth, there were cases in which the shoulder of the pocket ended up cracking or pinholes formed therein.

PRIOR ART DOCUMENTS

Patent Documents

[Patent Document 1] International Publication No. WO 2006/115264
[Patent Document 2] International Publication No. WO 2012/029323

DISCLOSURE OF THE INVENTION

Problems to be Solved by the Invention

Therefore, an object of the present invention is to provide an absorbing layer for a blister package that is free of the occurrence of molding defects and adequately imparts moldability even if a pocket is formed to a certain depth regardless of the type of molding machine, a laminate comprising that absorbing layer, and a blister package that uses that laminate.

Means for Solving the Problems

The inventors of the present invention found that the aforementioned problems are solved by the aspects indicated below.

[Aspect 1] An absorbing layer for a blister package, comprising the following in the order indicated:
an outer skin layer;
an intermediate layer comprising an inorganic absorbent and a binder resin; and,
an inner skin layer comprising 5% by mass to 80% by mass of a metallocene-based random polypropylene and 95% by mass to 20% by mass of a non-metallocene-based random polypropylene.

[Aspect 2]
The absorbing layer described in Aspect 1, wherein the inner skin layer comprises 25% by mass to 75% by mass of a metallocene-based random polypropylene and 75% by mass to 25% by mass of a non-metallocene-based random polypropylene.

[Aspect 3]
The absorbing layer described in Aspect 2, wherein the inner skin layer comprises 50% by mass to 75% by mass of a metallocene-based random polypropylene and 50% by mass to 25% by mass of a non-metallocene-based random polypropylene.

[Aspect 4]
The absorbing layer for a blister package described in any one of Aspects 1 to 3, wherein arithmetic average roughness Ra measured in compliance with ISO 4287 of the inner skin layer on the opposite side from the intermediate layer is 0.63 µm or more.

[Aspect 5]

The absorbing layer for a blister package described in any one of Aspects 1 to 4, wherein the interlayer bond strength measured in compliance with ISO 527-1 between the inner skin layer and the intermediate layer is 4.0 N/mm² or more.

[Aspect 6]

The absorbing layer for a blister package described in any one of Aspects 1 to 5, wherein the binder resin of the intermediate layer contains a metallocene-based random polypropylene and/or a non-metallocene-based random polypropylene and a polyethylene-based resin.

[Aspect 7]

The absorbing layer for a blister package described in Aspect 1 or 2, wherein nominal tensile strain at break measured in compliance with JIS K7127 is 26.0% to 120.0%.

[Aspect 8]

A laminate for a blister package comprising the absorbing layer described in any one of Aspects 1 to 7 and a substrate layer on the absorbing layer on the side of the outer skin layer.

[Aspect 9]

The laminate for a blister package described in Aspect 8, further comprising an aluminum layer between the substrate layer and the absorbing layer.

[Aspect 10]

The laminate for a blister package described in Aspect 9, further comprising a reinforcing layer between the aluminum layer and the absorbing layer.

[Aspect 11]

A blister package comprising the laminate described in any one of Aspects 8 to 10, a cover having a resin layer and an another aluminum layer different from the aluminum layer of the laminate; wherein, the laminate and the cover are at least partially adhered, a pocket is formed in the laminate, and contents are able to be contained between the laminate and the cover.

[Aspect 12]

A blister packaging product having the blister package described in Aspect 11 and contents contained in the pocket.

[Aspect 13]

A blister package comprising a laminate for a blister package and a cover; wherein, the laminate and the cover are at least partially adhered, a pocket is formed in the laminate, and contents are able to be contained between the laminate and the cover; and, the laminate comprises the layers indicated below in that order:

an substrate layer comprising a polyamide;

an aluminum layer;

an outer skin layer comprising a mixture of a low-density polyethylene and a metallocene-based random polypropylene;

an intermediate layer comprising a zeolite and a binder resin containing a low-density polyethylene and a metallocene-based random polypropylene; and, an inner skin layer comprising 50% by mass to 75% by mass of a metallocene-based polypropylene and 50% by mass to 25% by mass of a non-metallocene-based random polypropylene; wherein, the cover comprises a polypropylene-based resin layer that contacts the inner skin layer and another aluminum layer in addition to the aluminum layer, the arithmetic surface roughness Ra of the inner skin layer on the opposite side from the intermediate layer is 0.63 μm or more, and the interlayer bond strength between the inner skin layer and the intermediate layer is 4.0 N/mm² or more.

Effects of the Invention

According to the present invention, a blister package provided with an absorbing layer having a pocket of a certain depth can be produced with minimal occurrence of molding defects. The use of such a blister package makes it possible to store comparatively large contents in a stable state over a long period of time.

EMBODIMENT FOR CARRYING OUT THE INVENTION

<Absorbing Layer for Blister Package>

The absorbing layer for a blister package of the present invention comprises, in the following order, an outer skin layer, an intermediate layer comprising an inorganic absorbent and a binder resin, and an inner skin layer comprising a metallocene-based random polypropylene and a non-metallocene-based random polypropylene. In order to prevent the inorganic absorbent contained in the intermediate layer from desorption during use and to facilitate production of the absorbing layer, it is used by being sandwiched between upper and lower skin layers.

Here, the outer skin layer is a layer used on the side opposite from the side on which the contents of the blister package are inserted (outside), while the inner skin layer is a layer used on the side on which the contents are inserted (inside).

Figure 1:
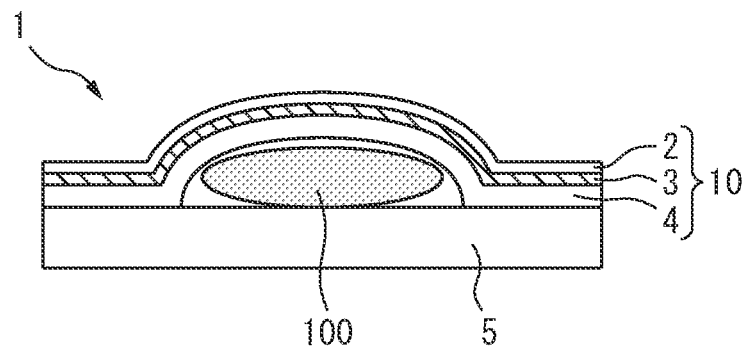
FIG. 1 is a schematic diagram of a blister package provided with an absorbing layer.
Figure 2:
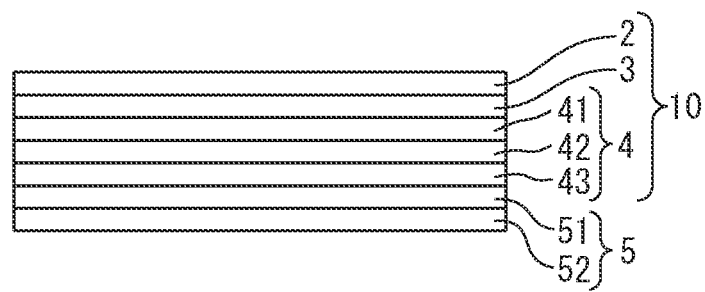
FIG. 2 is a schematic diagram of the layer structure of the blister package of the present invention.

As shown in FIG. 1, an absorbing layer 4 for a blister package of the present invention can be used in a blister package 1 of the present invention by laminating with a substrate layer 2 and an aluminum layer 3. In addition, as shown in FIG. 2, the absorbing layer 4 for a blister package of the present invention has an outer skin layer 41, an intermediate layer 42 and an inner skin layer 43.

An absorbing layer comprising an outer skin layer, intermediate layer and inner skin layer can be produced by an inflation method. This method comprises simultaneously extruding a plurality of resins in the form of a tube with a plurality of extruding machines and inflating the tube by blowing air inside to produce a multilayer film. In addition, the intermediate layer of the absorbing layer can be molded into the form of a film or sheet by subjecting a resin composition containing a mixture of an inorganic absorbent and binder resin to an inflation method, T-die method or other type of extrusion molding or injection molding, and after having formed the outer skin layer and inner skin layer into a film using a known method, the intermediate layer is interposed there between and laminated to produce an absorbing layer.

Examples of molding methods when molding the pocket of the blister package include plate-type air pressure molding, plug assist air pressure molding, drum-type air pressure molding and plug molding. Among these, plug molding, which uses a cylindrical rod (plug) having a round tip made of ultra-high molecular weight polyethylene resin having a viscosity-average molecular weight of 1,000,000 or more, is preferable for forming the pocket. However, when a deep pocket is attempted to be formed with this method, cracks may form in the skirt or shoulder of the aluminum layer and/or absorbing layer of a dome-shaped pocket.

The inventors of the present invention found that, in the case friction between the plug and the inner skin layer of the absorbing layer contacted by the plug is large, there is a high probability of cracks forming in the absorbing layer for a blister package when forming the pocket. Namely, in the case of large friction between the plug and inner skin layer, only the portion contacted by the plug and inner skin layer is stretched considerably, large tensile stress is generated in the laminate at that location, and this is thought to result in the formation of cracks.

Therefore, the inventors of the present invention decided to form the inner skin layer of the absorbing layer with a specific resin and roughen the surface thereof to make it easier for the plug to slide when pushed into the inner skin layer so that strain is applied as uniformly as possible over the entire surface that is pushed in. Simultaneous thereto, the inventors of the present invention found that, as a result of forming the inner skin layer with a specific resin, mechanical properties of the entire absorbing layer become suitable and as a result thereof, the absorbing layer is able to oppose the aforementioned tensile stress, thereby improving moldability when forming the pocket.

The mechanical properties of the absorbing layer can be evaluated in terms of nominal tensile strain at break. Nominal tensile strain at break of the absorbing layer when measured in accordance with JIS K7127 is such that, in the case of a sample having a length of 50 mm is extended to a length of 100 mm and then brakes, for example, nominal tensile strain at break is recorded as 100%. The nominal tensile strain at break of this absorbing layer is preferably 26.0% or more, 27.0% or more or 30.0% or more, and 120.0% or less, 100.0% or less, 90.0% or less, 80.0% or less, 70.0% or less, 60.0% or less, 50.0% or less or 40.0% or less.

(Inner Skin Layer)

The inner skin layer comprises 5% by mass to less than 85% by mass of a metallocene-based random polypropylene and 95% by mass or less to more than 15% by mass of a non-metallocene-based random polypropylene. From the viewpoint of imparting high surface roughness in particular, the inner skin layer comprises 10% by mass or more, 25% by mass or more or 50% by mass or more and less than 85% by mass, 80% by mass or less or 75% by mass or less of a metallocene-based random polypropylene, and comprises 90% by mass or less, 75% by mass or less or 50% by mass or less and more than 15% by mass, 20% by mass or more or 25% by mass or more of a non-metallocene-based random polypropylene. In addition, from the viewpoint of imparting high mechanical properties in particular, the inner skin layer preferably 15% or more by weight, 20% by mass or more, 25% by mass or more or 30% by mass or more and 85% by mass or less, 80% by mass or less, 75% by mass or less or 70% by mass or less of a metallocene-based random polypropylene, and comprises 15% by mass or more, 20% by mass or more, 25% by mass or more or 30% by mass or more and 85% by mass or less, 80% by mass or less, 75% by mass or less or 70% by mass or less of a non-metallocene-based random polypropylene.

In the present description, a metallocene-based random polypropylene refers to a random polypropylene that has been polymerized using metallocene as catalyst. In addition, in the present description, a non-metallocene-based random polypropylene refers to a random polypropylene that has been polymerized without using metallocene as catalyst. Here, examples of non-metallocene-based random polypropylenes include Ziegler-Natta-based random polypropylene.

In the present invention, the metallocene-based random polypropylene may be a polypropylene having a comparatively low content of low molecular weight components, and in particular, may be a polypropylene in which the ratio of weight-average molecular weight (Mw)/number-average molecular weight (Mn), as measured by gel permeation chromatography (GPC) using standard polystyrene, is 1.0 or more, 1.5 or more or 2.0 or more and 3.0 or less, 2.8 or less, 2.6 or less or 2.5 or less.

Additionally or alternatively, the metallocene-based random polypropylene may be a polypropylene having a substantially low content of crystallinity components, and in particular, may be a polypropylene in which the temperature difference (T(A4)-T(A1)) between the peak temperature (T(A1)) observed at high temperatures and the temperature (T(A4)) at which 99.4% by mass elutes, as measured by temperature rising elution fractionation (TREF) and determined from a TREF elution curve obtained by plotting elution amount versus temperature (dwt %/dT), is 10° C. or less, 8° C. or less or 5° C. or less. Here, Japanese Unexamined Patent Publication No. 2015-021043 may be referred to regarding details of the measurement conditions used during GPC and TREF.

In addition, the non-metallocene-based random polypropylene may be polypropylene having a comparatively high content of low molecular weight components, and in particular, may be a polypropylene in which the ratio of weight-average molecular weight (Mw)/number-average molecular weight (Mn), as measured by gel permeation chromatography (GPC) using standard polystyrene, is greater than 2.5, greater than 2.6, greater than 2.8 or greater than 3.0 and 10 or less, 5.0 or less, 4.5 or less or 4.0 or less. Additionally or alternatively, the non-metallocene-based random polypropylene may be a polypropylene having a substantially high content of crystallinity components, and in particular, may be a polypropylene in which the temperature difference (T(A4)-T(A1)) between the peak temperature (T(A1)) observed at high temperatures and the temperature (T(A4)) at which 99.4% by mass elutes, as measured by temperature rising elution fractionation (TREF) and determined from a TREF elution curve obtained by plotting elution amount versus temperature (dwt %/dT), is 3° C. or more, 5° C. or more, 8° C. or more or 10° C. or more and 20° C. or less or 15° C. or less.

Here, a random polypropylene as referred to in the present description refers to a random copolymer having propylene as the main component and having ethylene and/or an α-olefin having 4 carbon atoms or less as added components, and for example, is a random copolymer comprised of 90% by mass to 98% by mass of polypropylene and 10% by mass to 2% by mass of ethylene and/or α-olefin having 4 carbon atoms or less. The random polypropylene is preferably a random copolymer comprised of 95% by mass to 98% by mass of polypropylene and 5% by mass to 2% by mass of ethylene and/or α-olefin having 4 carbon atoms or less. The random polypropylene used in the present invention has a melt flow rate (MFR), as measured in compliance with JIS K7210, within the range of 0.5 g/10 min to 100 g/10 min, preferably within the range of 1.5 g/10 min to 50 g/10 min, more preferably within the range of 3.0 g/10 min to 20 g/10 min, and even more preferably within the range of 5.0 g/10 min to 10 g/10 min.

The arithmetic surface roughness Ra of the inner skin layer on the opposite side from the intermediate layer, in the case of measuring in compliance with ISO4287, is preferably 0.63 μm or more and more preferably 0.64 μm or more. In the case of large surface roughness, since the contact area between the inner layer and plug becomes smaller, friction with the plug deceases, and this is thought to reduce the likelihood of the occurrence of localized strain at the portion where there is contact between the plug and inner skin layer. From the viewpoint of film strength, arithmetic surface roughness Ra is preferably 1.50 µm or less, more preferably 1.30 µm or less and even more preferably 1.00 µm or less.

The inner skin layer can further contain other resin within a range that satisfies the aforementioned conditions. Examples of resins that can be additionally used include a polyethylene-based resins, other polypropylene-based resins, saturated or unsaturated polyesters, polyvinyl chloride (PVC), polystyrene, derivatives thereof and mixtures thereof. Preferably, the inner skin layer contains the same resin as that of the intermediate layer contacted by the skin layer and the resin layer on the surface layer of the cover on the side of the inner skin layer, and adhesion with these layer is enhanced as a result thereof.

Furthermore, a polyethylene-based resin as referred to in the present description refers to a resin that contains 30 mol % or more, 40 mol % or more, 50 mol % or more, 60 mol % or more, 70 mol % or more or 80 mol % or more of ethylene group repeating units in the polymer main chain, and examples thereof include polyethylene-based resins selected from the group consisting of low-density polyethylene (LDPE), linear low-density polyethylene (LLDPE), medium-density polyethylene (MDPE), high-density polyethylene (HDPE), ethylene-acrylic acid copolymer (EAA), ethylene-methacrylic acid copolymer (EMAA), ethylene-ethyl acrylate copolymer (EEA), ethylene-methyl acrylate copolymer (EMA), ethylene-vinyl acetate copolymer (EVA), carboxylic acid-modified polyethylene, carboxylic acid-modified polyethylene-vinyl acetate copolymer, derivatives thereof and mixtures thereof.

In addition, a polypropylene-based resin as referred to in the present description refers to a resin containing 30 mol % or more, 40 mol % or more, 50 mol % or more, 60 mol % or more, 70 mol % or more or 80 mol % or more of propylene group repeating units in the polymer main chain, and examples thereof include polypropylene (PP) homopolymers, random polypropylene (random PP), block polypropylene (block PP), chlorinated polypropylene, carboxylic acid-modified polypropylene, derivatives thereof and mixtures thereof.

The thickness of the inner skin layer is preferably 5 µm or more, 10 µm or more or 20 µm or more, and preferably 100 µm or less, 70 µm or less, 50 µm or less or 40 µm or less.

(Outer Skin Layer)

Examples of resins forming the outer skin layer include polyethylene-based resins, polypropylene-based resins, saturated or unsaturated polyesters, polyvinyl chloride (PVC), polystyrene, derivatives thereof and mixtures thereof. Among these, resins obtained by combining LLDPE and a metallocene-based random polypropylene are preferable from the viewpoint of imparting suitable elasticity to a film. Preferably, the outer skin layer contains a resin or metallocene-based polypropylene that is the same as that of the intermediate layer, and adhesion with the intermediate layer is enhanced as a result thereof. In addition, from the viewpoint of facilitating production, the outer skin layer and inner skin layer are preferably formed of the same resin. Moreover, in the case the outer skin layer contains a metallocene-based random polypropylene, even if the intermediate layer is formed of only a polyethylene-based resin not contained in the outer skin layer, high interlayer bond strength can be imparted due to the high compatibility between the two.

From the viewpoint of obtaining suitable moldability and elasticity, the thickness of the outer skin layer is preferably 5 µm or more, 10 µm or more or 20 µm or more, and preferably 100 µm or less, 70 µm or less, 50 µm or less or 40 µm or less.

(Intermediate Layer)

The intermediate layer comprises an inorganic absorbent and a binder resin. In addition, a binder resin containing the aforementioned metallocene-based random polypropylene and/or non-metallocene-based random polypropylene and a polyethylene-based resin is used preferably. The inventors of the present invention found that the interlayer bond strength between the intermediate layer and inner skin layer can be enhanced by such an aspect of the present invention. The intermediate layer functions as an absorbing layer that absorbs moisture, organic components and the like present in the blister package. High interlayer bond strength can be imparted between the intermediate layer and the aforementioned inner skin layer by containing a binder of the same type as the resin contained in the inner skin layer in the binder resin.

The intermediate layer preferably contains 5% by mass to 90% by mass of a polyethylene-based resin and 3% by mass to 60% by mass of a metallocene-based random polypropylene and/or non-metallocene-based random polypropylene based on the weight of the intermediate layer, more preferably contains 10% by mass to 70% by mass of a polyethylene-based resin and 5% by mass to 40% by mass of a metallocene-based random polypropylene and/or non-metallocene-based random polypropylene, and even more preferably contains 20% by mass to 60% by mass of a polyethylene-based resin and 5% by mass to 20% by mass of a metallocene-based random polypropylene and/or non-metallocene-based random polypropylene. In the case of using these resins within such ranges, high interlayer bond strength can be imparted between the intermediate layer and the inner skin layer, and the intermediate layer is able to favorably function as a binder.

Adhesion with the inner skin layer containing a non-metallocene-based random polypropylene and metallocene-based random polypropylene is enhanced by containing a metallocene-based random polypropylene and/or non-metallocene-based random polypropylene in the intermediate layer. Interlayer bond strength with the inner skin layer in the case of having measured in compliance with ISO527-1 is preferably 4.0 N/mm$^2$ or more, more preferably 4.5 N/mm$^2$ or more and even more preferably 4.8 N/mm$^2$ or more. If interlayer bond strength between the inner skin layer and intermediate layer is excessively low, a phenomenon is thought to occur in which the inner skin layer and intermediate layer partially peel (delaminate) during molding, thereby causing separation between the inner skin layer and intermediate layer at that portion and preventing the two layers from moving together. At this time, force generated by the plug concentrates at the portion where peeling has not occurred, resulting in the generation of excessive stress, and in turn resulting in increased susceptibility to the occurrence of problems such as the formation of cracks or fissures in some or all layers of the laminate.

In addition to the aforementioned metallocene-based random polypropylene and/or non-metallocene-based random polypropylene and polyethylene-based resin, examples of binder resins that can be further contained in the intermediate layer include other polypropylene-based resins, saturated or unsaturated polyesters, ionomers, polyvinyl chloride (PVC), polystyrene, derivatives thereof and mixtures thereof.

Examples of inorganic absorbents that can be used in the intermediate layer include chemical absorbents such as calcium oxide, calcium chloride, calcium sulfate, magnesium sulfate or sodium sulfate, and physical absorbents such as aluminum oxide, quick lime, silica gel or inorganic molecular sieves. Although there are no particular limitations thereon, examples of inorganic molecular sieves include aluminosilicate minerals, clay, porous glass, microporous activated carbon, zeolite, activated carbon and compounds having structural openings that are capable of allowing diffusion of water and other small molecules. Such inorganic absorbents allow the obtaining of high absorbency even at low temperature ranges, and in the case of absorbing the moisture contained in trace amounts in a blister package, the use of an absorbent capable of demonstrating high absorbency even in such environments having low relative humidity is particularly preferable.

Examples of zeolite that can be used include natural zeolite, artificial zeolite and synthetic zeolite. Zeolite is a porous, granular substance used to separate substances according to differences in molecular size, has a structure consisting of uniform pores, and since it has the action of a type of sieve by absorbing small molecules that enter the cavities of those pores, is capable of absorbing water (including steam and water vapor) and organic gases. An example of synthetic zeolite is a molecular sieve, and among these, molecular sieves having a pore diameter (absorption opening) of 0.3 nm to 1 nm in particular can be used. Normally, molecular sieves having a pore diameter of 0.3 nm, 0.4 nm, 0.5 nm or 1 nm are respectively referred to as molecular sieve 3A, molecular sieve 4A, molecular sieve 5A and molecular sieve 13X. Molecular sieves are used that have an average particle diameter (particle diameter having an integrated value of 50% in a particle size distribution determined by laser diffraction scattering) of about 10 μm. In the present invention, these zeolites can be suitably used accordingly corresponding to such factors as the target substance to be absorbed and content properties.

In addition, since organic gases are frequently the causative substance in the case of absorbing odors in particular, hydrophobic zeolite is used preferably. Hydrophobic zeolite is the generic term for so-called high-silica zeolite in which the ratio of silica to alumina has been increased by reducing the number of aluminum atoms within the crystal structure of zeolite by subjecting to dealumination treatment. Hydrophobic zeolite is zeolite that has lost its affinity for water and other polar substances causing it to more strongly absorb non-polar substances, thereby making it easier to absorb organic gases. One example of hydrophobic zeolite in the form of a hydrophobic molecular sieve that can be used has a pore diameter of 0.6 nm to 0.9 nm, and examples of commercially available products thereof include Abscents™ 1000, Abscents™ 2000 and Abscents™ 3000 (all manufactured by Union Showa K.K.). Pore diameter can be confirmed by analyzing structure using X-ray diffraction. In addition, hydrophobic zeolite is used that has an average particle diameter (particle diameter having an integrated value of 50% in a particle size distribution determined by laser diffraction scattering) of, for example, 3 μm to 5 μn.

From the viewpoint of absorption capacity, the inorganic absorbent can be contained in the intermediate layer within the range of 5% by mass or more, 10% by mass or more, 20% by mass or more, 30% by mass or more, 40% by mass or more or 50% by mass or more based on the weight of the intermediate layer, and from the viewpoint of dispersibility in the binder resin and moldability, can be contained in the intermediate layer within the range of 90% by mass or less, 80% by mass or less, 70% by mass or less or 60% by mass or less.

In addition, the inorganic absorbent can be contained at 5% by volume or more, 10% by volume or more, 20% by volume or more or 30% by volume or more and 70.0% by volume or less, 65% by volume or less, 60% by volume or less, 55% by volume or less or 50% by volume or less.

Furthermore, in the case of calculating the volume percentage of inorganic absorbent contained in a layer and the specific gravity of the inorganic absorbent is uncertain, after having first determined the specific gravity of that layer by measuring, the volume percentage of the inorganic absorbent may then be determined from the weights at which the inorganic absorbent and thermoplastic resin have been added and the specific gravity of the thermoplastic resin. For example, in the case of a layer having specific gravity of 1.1 g/cm$^3$ that has been molded using 50 g of inorganic absorbent and 50 g of thermoplastic resin having specific gravity of 0.9 g/cm$^3$, the inorganic absorbent contained in that layer can be calculated to have a specific gravity of 1.41 g/cm$^3$ and can be said to be present in that layer at 38.9% by volume.

Although the inorganic absorbent may be contained in the inner skin layer and/or outer skin layer, it is preferably contained at 40% by volume or less, 30% by volume or less, 28.8% by volume or less, 20% by volume or less, 10% by volume or less or 5% by volume or less in consideration of such factors as the moldability of these layers or their ease of lamination with other layers.

From the viewpoint of absorption capacity, moldability and elasticity, the thickness of the intermediate layer is preferably 20 μm or more, 30 μm or more or 40 μm or more and preferably 500 μm or less, 300 μm or less, 200 μm or less, 150 μm or less or 100 μm or less.

<Laminate for Blister Package>

The laminate for a blister package of the present invention has the aforementioned absorbing layer and a substrate layer on the side of the outer skin layer of the absorbing layer. Preferably, the laminate for a blister package of the present invention has an aluminum layer between the absorbing layer and the substrate layer. In addition, it may also have a reinforcing layer between this aluminum layer and the absorbing layer. In addition, it may also have an adhesive layer between any two of the substrate layer, aluminum layer, reinforcing layer and absorbing layer.

For example, as shown in FIG. 1, a laminate 10 for a blister package of the present invention has a substrate layer 2, an aluminum layer 3 and an absorbing layer 4.

A known lamination method such as dry lamination or extrusion lamination can be used to laminate any two layers of the substrate layer, aluminum layer, reinforcing layer and absorbing layer.

(Substrate Layer)

There are no particular limitations on the resin used for the substrate layer provided it is a resin that imparts suitable moldability to the laminate for a blister package. Examples thereof include polyethylene-based resins, polypropylene-based resins, polyvinylidene chloride, polychlorotrifluoroethylene, saturated or unsaturated polyesters (such as polyethylene terephthalate or polybutylene terephthalate), polyamides (such as Nylon, Nylon 6, Nylon 6,6 or Nylon MXD6) and mixtures thereof. Preferably, the resin has superior moisture resistance that prevents moisture or oxygen and the like from entering from the outside, and particularly preferable examples thereof include polypropylene-based resins, polyamide and polyethylene terephthalate.

The thickness of the substrate layer is preferably 10 µm or more, 20 µm or more or 30 µm or more and preferably 300 µm or less, 200 µm or less or 100 µm or less.

(Aluminum Layer)

The aluminum layer is used to impart barrier properties. The aluminum layer may be pure aluminum-based aluminum foil or aluminum alloy-based aluminum foil. In order to impart suitable moldability and elasticity to the laminate for a blister package, the thickness of the aluminum layer is preferably 7 µm or more, 10 µm or more or 20 µm or more and 60 µm or less, 50 µm or less or 40 µm or less.

(Reinforcing Layer)

The reinforcing layer is used to improve moldability of the laminate for a blister package. The reinforcing layer may be formed of polyvinyl chloride, saturated or unsaturated polyester (such as polyethylene terephthalate or polybutylene terephthalate), polyamide or mixtures thereof. The thickness of the reinforcing layer is preferably 15 µm or more or 25 µm or more and 60 µm or less or 50 µm or less. A reinforcing layer like that described in the aforementioned Patent Document 3 can be used for the reinforcing layer of the present invention.

The laminate for a blister package of the present invention may also have an anchor coating layer or primer layer between any two of the substrate layer, aluminum layer, reinforcing layer and absorbing layer for the purpose of enhancing adhesion with a printer layer or between two layers.

<Blister Package and Blister Packaging Product>

The blister package of the present invention has the aforementioned laminate for a blister package and a cover. The laminate and the cover are at least partially adhered, and particularly in the case the two outermost layers of the aforementioned laminate for a blister package consist of the substrate layer and the inner skin layer of the absorbing layer, the cover is adhered to the inner skin layer. After having molded a pocket for containing contents in the laminate for a blister package, contents can be contained in the pocket followed by adhering the cover to produce a blister packaging product in which contents are housed in the pocket of the blister package.

(Cover)

The cover comprises a resin layer and another aluminum layer in addition to the aluminum layer that may be contained in the aforementioned laminate for a blister package. Here, "another aluminum layer" refers to an aluminum layer made of the same material and having the same thickness, or in other words, means that the same aluminum layer may each be present in the laminated for a blister package and the cover. The resin of the resin layer thereof is selected from the group consisting of polypropylene-based resins, polyvinyl chloride, ethylene-vinyl acetate copolymer and mixtures thereof. Preferably, the cover employs a form in which the resin layer is coated onto the aluminum layer. Preferably, the same resin is contained in the resin layer of the cover and the layer that adheres with the laminate for a blister package (inner skin layer) from the viewpoint of enhancing adhesion.

(Contents)

There are no particular limitations on the contents of the blister package of the present invention provided it is a substance that can be deteriorated by contact with the outside air, and examples thereof include pharmaceutical preparations, foods, cosmetics, medical devices and electronic components. In addition, examples of pharmaceutical preparations include detergents and agricultural chemicals in addition to prescription pharmaceutical preparations.

FIG. 1 is a schematic diagram of a blister package 1 provided with an absorbing layer. Here, a cover 5 is adhered to a laminate 10 for a blister package obtained by laminating a substrate 2, an aluminum layer 3 and an absorbing layer 4 in that order, and contents 100 are enclosed in a dome-shaped pocket formed in the laminate 10. Although not shown in the drawing, in the case of laminating according to a dry lamination method, an adhesive layer is present between the substrate layer and the aluminum layer, and between the aluminum layer and the absorbing layer.

FIG. 2 is a schematic diagram of the layer structure of the blister package of the present invention. This drawing shows an end portion of the blister package where the pocket is not formed, and the cover 5 is adhered to the laminate 10 for a blister package obtained by laminating the substrate 2, aluminum layer 3 and absorbing layer 4 in that order. The absorbing layer 4 is formed of an outer skin layer 41, an intermediate layer 42 and an inner skin layer 43, and the cover 5 is formed of a resin layer 51 and an aluminum layer 52. A pocket for containing contents is formed in the laminate 10.

EXAMPLES

Experiment 1: Test of Effect of Surface Roughness of Inner Skin Layer

<Sample Production>

Laminates for a blister package of Examples 1 to 4 and Comparative Examples 1 and 2 having the compositions shown in the following Table 1 were produced while only changing the weight ratio between the metallocene-based PP and non-metallocene-based PP of the inner skin layer. The weight ratios between the metallocene-based PP and non-metallocene-based PP in each example are shown in Table 2. Furthermore, when an absorbing layer having an inner skin layer formed only of a metallocene-based PP was attempted to be formed into a film, the film formation was difficult due to excessive softness of the resin.

TABLE 1

Components Common to each Example

| | | Thickness (µm) | Material | Product Name |
|---|---|---|---|---|
| | Substrate layer | 25 | Polyamide (Nylon) | — |
| | Aluminum layer | 40 | Aluminum foil | Sumkeialumihaku Co. Ltd. |
| | Reinforcing layer | 60 | PVC | Sumilite VSS-6701 (Sumitomo Bakelite Co. Ltd.) |
| Absorbent layer | Outer skin layer | 20 | LLDPE: 50 mass % | Evolue SP2520 (Prime Polymer Co. Ltd.) |
| | | | Metallocene-based PP: 50 mass % | Wintec WFX4T (Japan Polypropylene Corp.) |

TABLE 1-continued

Components Common to each Example

| | Thickness (μm) | Material | Product Name |
|---|---|---|---|
| Intermediate layer | 60 | Zeolite: 46 mass % LDPE: 46 mass % Metallocene-based PP: 8 mass % | 4A (Union Showa K.K.) Petrocene 202 (Tosoh Corp.) Wintec WFX4T (Japan Polypropylene Corp.) |
| Inner skin layer | 30 | Non-metallocene-based PP Metallocene-based PP | Novatec FG3DC (Japan Polypropylene Corp.) Wintec WFX4T (Japan Polypropylene Corp.) |

With respect to the absorbing layer, after having first kneaded the materials of each layer while heating and melting, the kneaded product was then extruded into a blended state and cooled to obtain pellets for the outer skin layer, pellets for the intermediate layer and pellets for the inner skin layer. Each of the pellets was used to form a film serving as an absorbing layer by co-extrusion molding using inflation molding. Inflation molding was carried out with a three-layer inflation molding machine (3SOIB, Placo) at a resin temperature of 180° C. and take-up speed of 8 m/min.

The substrate layer, aluminum layer, reinforcing layer and outer skin layer of the absorbing layer were all laminated by dry lamination. At that time, a urethane-based adhesive (Takelac™ and Takenate™, Mitsui Chemicals Inc.), containing a main agent (A1143), curing agent (A3) and ethyl acetate at a weight ratio of 9:1:10, was used as an adhesive. Furthermore, the coated amount of adhesive between each layer was 5 g/m². Aging was carried out by storing for 3 days in an environment at 40° C. to cure the adhesive following lamination.

<Evaluation 1: Surface Roughness>

The surface roughness (arithmetic average roughness: Ra) of each layer was measured using a surface roughness measuring instrument (ET4000K, Kosaka Laboratory) in compliance with ISO4287. A diamond stylus having tip of R (radius) 2 μm and apex angle of 60° C. was used for the stylus. The results for the arithmetic average roughness Ra of the inner skin layer are shown in Table 2.

<Evaluation 2: Interlayer Bond Strength>

The interlayer bond strength between the inner skin layer and intermediate layer of Examples 1 and 2 and Comparative Example 2 was measured using a tensile tester (Strograph VE100, Toyo Seiki Seisakusho) in compliance with ISO527-1. Interlayer bond strength between the inner skin layer and intermediate layer is shown in Table 2.

<Evaluation 3: Molding Test>

A pocket for a pharmaceutical preparation having a depth of 5.00 mm to 6.00 mm at room temperature was molded in the laminates for a blister package of Examples 1 to 4 and Comparative Examples 1 and 2. A high-speed hydraulic press (HYP505H) manufactured by Japan Automatic Machine Co., Ltd. was used for the molding machine. Ultra-high molecular weight polyethylene resin having a viscosity-average molecular weight of 5,500,000 (New Light™, Saxin) was used for the plug, plug diameter was 13 mm and molding speed was 200 mm/s.

Here, the case of the absence of the formation of cracks, scratches or other visual defects in the molded pocket was evaluated as acceptable (G), while the case of the formation of such defects was evaluated as unacceptable (NG). The pockets were evaluated 10 times each for each depth followed by evaluating the number of tests that yielded acceptable and unacceptable results. Those results are shown in Table 2.

TABLE 2

Details of Inner Skin Layer of Each Example

| | | Comp. Ex. 1 | Example 1 | Example 2 | Example 3 | Example 4 | Comp. Ex. 2 |
|---|---|---|---|---|---|---|---|
| Metallocene-based PP | | 85 | 75 | 50 | 25 | 10 | — |
| Non-metallocene-based PP | | 15 | 25 | 50 | 75 | 90 | 100 |
| Surface roughness | | 0.62 | 0.67 | 0.64 | 0.58 | 0.58 | 0.64 |
| Interlayer bond strength (N/mm²) | | — | 5.1 | 4.9 | — | — | 3.9 |
| Moldability (indentation depth) | 5.00 mm | G: 10 NG: 0 | G: 10 NG: 0 | G: 10 NG: 0 | G: 10 NG: 0 | G: 10 NG: 0 | G: 10 NG: 0 |
| | 5.25 mm | G: 9 NG: 1 | G: 10 NG: 0 | G: 10 NG: 0 | G: 10 NG: 0 | G: 10 NG: 0 | G: 9 NG: 1 |
| | 5.50 mm | G: 8 NG: 2 | G: 10 NG: 0 | G: 10 NG: 0 | G: 9 NG: 1 | G: 7 NG: 3 | G: 9 NG: 1 |
| | 5.75 mm | G: 2 NG: 8 | G: 10 NG: 0 | G: 10 NG: 0 | G: 5 NG: 5 | G: 4 NG: 6 | G: 4 NG: 6 |
| | 6.00 mm | — | G: 7 NG: 3 | G: 8 NG: 2 | — | — | — |

Based on the results of Table 2, there were no occurrences of defects up to a depth of 5.75 mm in Examples 1 and 2 and moldability was extremely favorable. In addition, there were also no occurrences of defects up to a depth of 5.25 mm in Examples 3 and 4 and moldability was favorable. In the case of using only a non-metallocene-based PP for the inner skin layer and not containing a non-metallocene-based PP in the intermediate layer (Comparative Example 2), although surface roughness was high, interlayer bond strength of the intermediate layer was low. As a result, the intermediate layer and inner skin layer did not remain together during molding, stress was generated in a portion of the layers of the film, and this is thought to have resulted in the formation of cracks or fissures.

Experiment 2: Test of Effect of Mechanical Strength of Absorbing Layer

<Sample Production>

Laminates for a blister package of Examples 5 to 7 and Comparative Examples 3 and 4 were produced to have the compositions shown in the following Table 3. The compositions of the inner skin layer and outer skin layer and the properties of the absorbing layer in each example are shown in Table 4. Furthermore, the compositions of the inner skin layer and outer skin layer were the same in Examples 5 to 7 and Comparative Examples 3 and 4. Furthermore, when an absorbing layer having an inner skin layer and outer skin layer formed only of a metallocene-based PP was attempted to be formed into a film, the film formation was difficult due to excessive softness of the resin.

The methods used to mold the absorbing layer and laminate the substrate layer and other layers were the same as those of the aforementioned Example 1.

<Evaluation 1: Nominal Tensile Strain at Break>

The nominal tensile strain at break relative to the direction of drawing was measured for the absorbing layer used in each example in compliance with JIS K7127. Nominal tensile strain at break was measured using a tensile tester (Strograph VES1D, Toyo Seiki Seisakusho) under conditions of a sample width of 15 mm, sample length of 150 mm and pulling speed of 300 mm/min.

<Evaluation 2: Molding Test>

Moldability was evaluated (by a molding test) in the same manner as in the aforementioned Experiment 1.

TABLE 3

| | | Thickness (μm) | Material | Product Name |
|---|---|---|---|---|
| Substrate layer | | 25 | Polyamide (Nylon) | — |
| Aluminum layer | | 40 | Aluminum foil | Sumkeialumihaku Co. Ltd |
| Reinforcing layer | | 60 | PVC | Sumilite VSS-6701 (Sumitomo Bakelite Co. Ltd.) |
| Absorbing layer | Outer skin layer | 20 | LLDPE | Evolue SP2520 (Prime Polymer Co. Ltd.) |
| | | | Non-metallocene-based PP | Novatec FG3DC (Japan Polypropylene Corp.) |
| | | | Metallocene-based PP | Wintec WFX4T (Japan Polypropylene Corp.) |
| | Intermediate layer | 90 | Zeolite: 46 mass % | 4A (Union Showa K.K.) |
| | | | LDPE: 54 mass % | Petrocene 202 (Tosoh Corp.) |
| | Inner skin layer | 20 | LLDPE | Evolue SP2520 (Prime Polymer Co. Ltd.) |
| | | | Non-metallocene-based PP | Novatec FG3DC (Japan Polypropylene Corp.) |
| | | | Metallocene-based PP | Wintec WFX4T (Japan Polypropylene Corp.) |

TABLE 4

Details of Absorbing layer of Each Example

| | | Comp. Ex. 3 | Example 5 | Example 6 | Example 7 | Comp. Ex. 4 |
|---|---|---|---|---|---|---|
| Composition of outer skin layer and inner skin layer | LLDPE (mass %) | 100 | 0 | 0 | 0 | 0 |
| | Metallocene-based PP (mass %) | 0 | 75 | 50 | 25 | 0 |
| | Non-metallocene-based PP (mass %) | 0 | 25 | 50 | 75 | 100 |
| Nominal tensile strain at break | [%] | 121.5 | 39.5 | 33.7 | 30.5 | 25.7 |
| Moldability (indentation depth) | 5.50 mm | G: 0 NG: 10 | G: 10 NG: 0 | G: 10 NG: 0 | G: 10 NG: 0 | G: 10 NG: 0 |
| | 5.75 mm | G: 0 NG: 10 | G: 10 NG: 0 | G: 10 NG: 0 | G: 10 NG: 0 | G: 7 NG: 3 |
| | 6.00 mm | G: 0 NG: 10 | G: 8 NG: 2 | G: 10 NG: 0 | G: 9 NG: 1 | G: 4 NG: 6 |
| | 6.25 mm | — | G: 2 NG: 8 | G: 1 NG: 9 | G: 1 NG: 9 | G: 0 NG: 10 |

Examples 5 to 7 according to the present invention all demonstrated favorable moldability. This is thought to be attributable to a proper balance between stretching ease and stiffness of the absorbing layer, or in other words, the nominal tensile strain at break being within a suitable range.

INDUSTRIAL APPLICABILITY

A laminate for a blister package that uses the absorbing layer of the present invention allows the molding of a deep pocket therein, and a blister package using that laminate makes it possible to store comparatively large contents in a stable state (by inhibiting deterioration) over a long period of time.

BRIEF DESCRIPTION OF THE REFERENCE SYMBOLS

1 Blister packaging product provided with absorbing layer
10 Laminate for blister package
2 Substrate layer
3 Aluminum layer
4 Absorbing layer
41 Outer skin layer
42 Intermediate layer
43 Inner skin layer
5 Cover
51 Resin layer
52 Aluminum layer
100 Contents

The invention claimed is:

1. An absorbing layer for a blister package, comprising the following in the order indicated:
   an outer skin layer;
   an intermediate layer comprising an inorganic absorbent and a binder resin; and,
   an inner skin layer comprising 5% by mass to 80% by mass of a metallocene-based random polypropylene and 95% by mass to 20% by mass of a non-metallocene-based random polypropylene.

2. The absorbing layer for a blister package described in claim 1, wherein arithmetic average roughness Ra measured in compliance with ISO4287 of the inner skin layer on the opposite side from the intermediate layer is 0.63 µm or more.

3. The absorbing layer for a blister package described in claim 1, wherein the interlayer bond strength measured in compliance with ISO527-1 between the inner skin layer and the intermediate layer is 4.0 N/mm$^2$ or more.

4. The absorbing layer for a blister package described in claim 1, wherein the binder resin of the intermediate layer contains a metallocene-based random polypropylene and/or a non-metallocene-based random polypropylene and a polyethylene-based resin.

5. The absorbing layer for a blister package described in claim 1, wherein nominal tensile strain at break measured in compliance with JIS K7127 is 26.0% to 120.0%.

6. The absorbing layer described in claim 1, wherein the inner skin layer comprises 25% by mass to 75% by mass of a metallocene-based random polypropylene and 75% by mass to 25% by mass of a non-metallocene-based random polypropylene.

7. The absorbing layer described in claim 6, wherein the inner skin layer comprises 50% by mass to 75% by mass of a metallocene-based random polypropylene and 50% by mass to 25% by mass of a non-metallocene-based random polypropylene.

8. A laminate for a blister package comprising the absorbing layer described in claim 1 and a substrate layer on the absorbing layer on the side of the outer skin layer.

9. The laminate for a blister package described in claim 8, further comprising an aluminum layer between the substrate layer and the absorbing layer.

10. The laminate for a blister package described in claim 9, further comprising a reinforcing layer between the aluminum layer and the absorbing layer.

11. A blister package comprising the laminate described in claim 8, a cover having a resin layer and an another aluminum layer different from the aluminum layer of the laminate; wherein, the laminate and the cover are at least partially adhered, a pocket is formed in the laminate, and contents are able to be contained between the laminate and the cover.

12. A blister packaging product having the blister package described in claim 11 and contents contained in the pocket.

13. A blister package comprising a laminate for a blister package and a cover; wherein, the laminate and the cover are at least partially adhered, a pocket is formed in the laminate, and contents are able to be contained between the laminate and the cover; and,
   the laminate comprises the layers indicated below in that order:
   an substrate layer comprising a polyamide;
   an aluminum layer;
   an outer skin layer comprising a mixture of a low-density polyethylene and a metallocene-based random polypropylene;
   an intermediate layer comprising a zeolite and a binder resin containing a low-density polyethylene and a metallocene-based random polypropylene; and,
   an inner skin layer comprising 50% by mass to 75% by mass of a metallocene-based polypropylene and 50% by mass to 25% by mass of a non-metallocene-based random polypropylene; wherein,
   the cover comprises a polypropylene-based resin layer that contacts the inner skin layer and another aluminum layer in addition to the aluminum layer,
   the arithmetic surface roughness Ra of the inner skin layer on the opposite side from the intermediate layer is 0.63 µm or more, and
   the interlayer bond strength between the inner skin layer and the intermediate layer is 4.0 N/mm$^2$ or more.

* * * * *